(12) United States Patent
Hayashitani

(10) Patent No.: US 8,730,569 B2
(45) Date of Patent: May 20, 2014

(54) LIGHT POWER CONTROL SYSTEM, LIGHT POWER CONTROL NODE APPARATUS, AND METHOD OF CONTROLLING LIGHT POWER

(75) Inventor: Masahiro Hayashitani, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 13/505,778

(22) PCT Filed: Nov. 2, 2010

(86) PCT No.: PCT/JP2010/069511
§ 371 (c)(1),
(2), (4) Date: May 3, 2012

(87) PCT Pub. No.: WO2011/055724
PCT Pub. Date: May 12, 2011

(65) Prior Publication Data
US 2012/0218617 A1    Aug. 30, 2012

(30) Foreign Application Priority Data
Nov. 5, 2009 (JP) ................................. 2009-254135

(51) Int. Cl.
*H01S 3/00* (2006.01)
*H01S 3/067* (2006.01)

(52) U.S. Cl.
CPC ............ *H01S 3/06754* (2013.01); *Y10S 359/90* (2013.01)
USPC .............. 359/341.4; 359/341.41; 359/341.42; 359/900

(58) Field of Classification Search
USPC ............. 359/238, 341.4, 341.41, 341.42, 900
See application file for complete search history.

(56) References Cited

U.S. PATENT DOCUMENTS

| | | | |
|---|---|---|---|
| 6,288,836 | B1 | 9/2001 | Kawasaki et al. |
| 2003/0099032 | A1 | 5/2003 | Asao et al. |
| 2007/0116470 | A1 | 5/2007 | Mino |

FOREIGN PATENT DOCUMENTS

| | | |
|---|---|---|
| JP | 11-122192 A | 4/1999 |
| JP | 2003-163643 A | 6/2003 |
| JP | 2006-166478 A | 6/2006 |
| JP | 2007-150471 A | 6/2007 |

OTHER PUBLICATIONS

International Search Report for PCT/JP2010/069511 dated Jan. 25, 2011.

*Primary Examiner* — Jack Dinh
(74) *Attorney, Agent, or Firm* — Sughrue Mion, PLLC

(57) ABSTRACT

A light power control system is used in a network in which a control signal is transmitted to instruct setting of a wavelength path. The light power control system is provided with a light amplifier control section configured to carry out a constant output control to a light amplifier which amplifies a light signal transmitted from a node to another node, when said node in said network receives the control signal; and a variable optical attenuator control section configured to adjust an attenuation quantity of a variable optical attenuator to attenuate a light power of the light signal on any of wavelength paths, when said node receives the control signal and moreover the light signal is transmitted on said any of wavelength paths of said node. It becomes possible to receive the data right in a receiving end by a simple unit when there is a change of the number of wavelength paths.

18 Claims, 10 Drawing Sheets

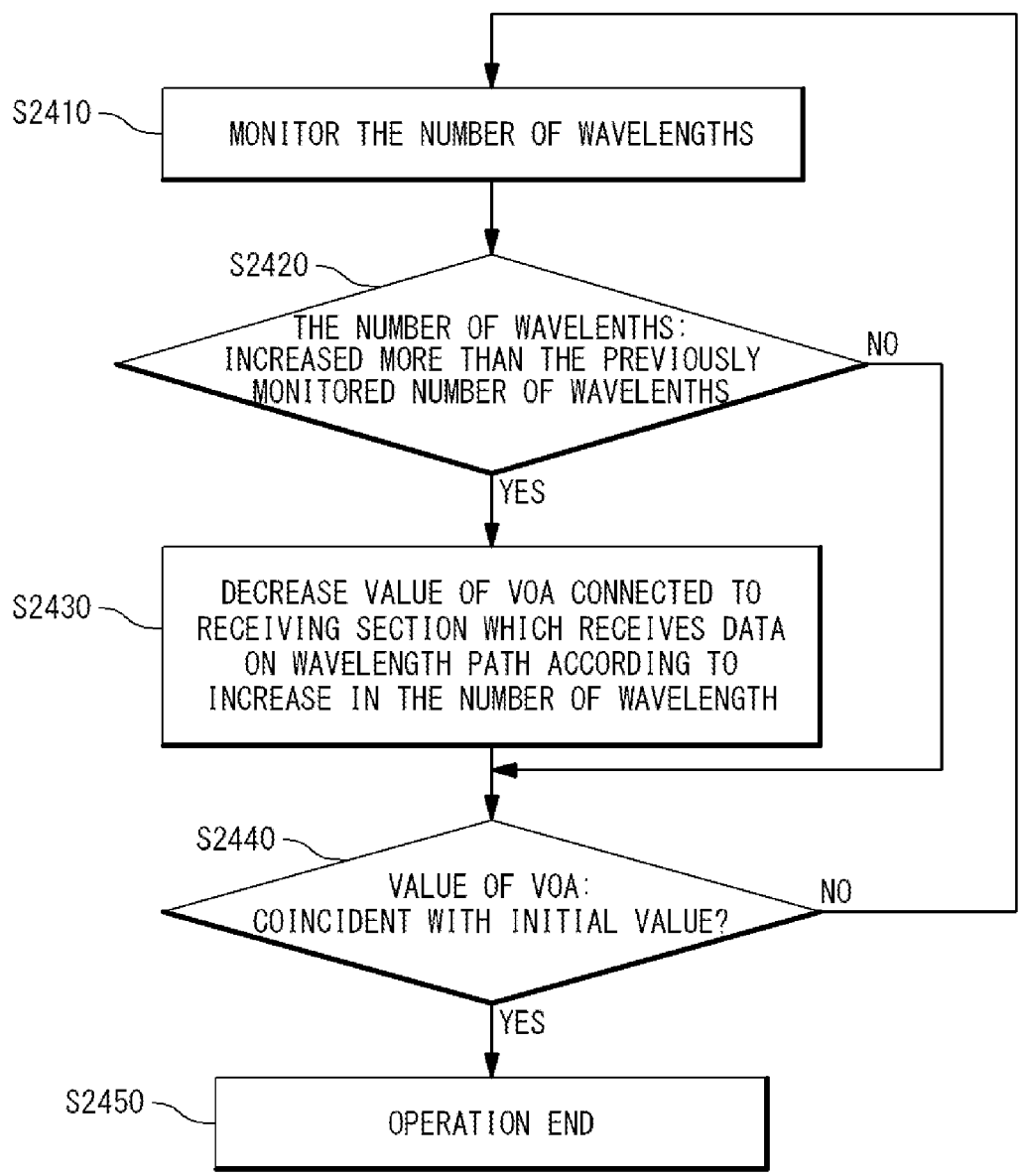

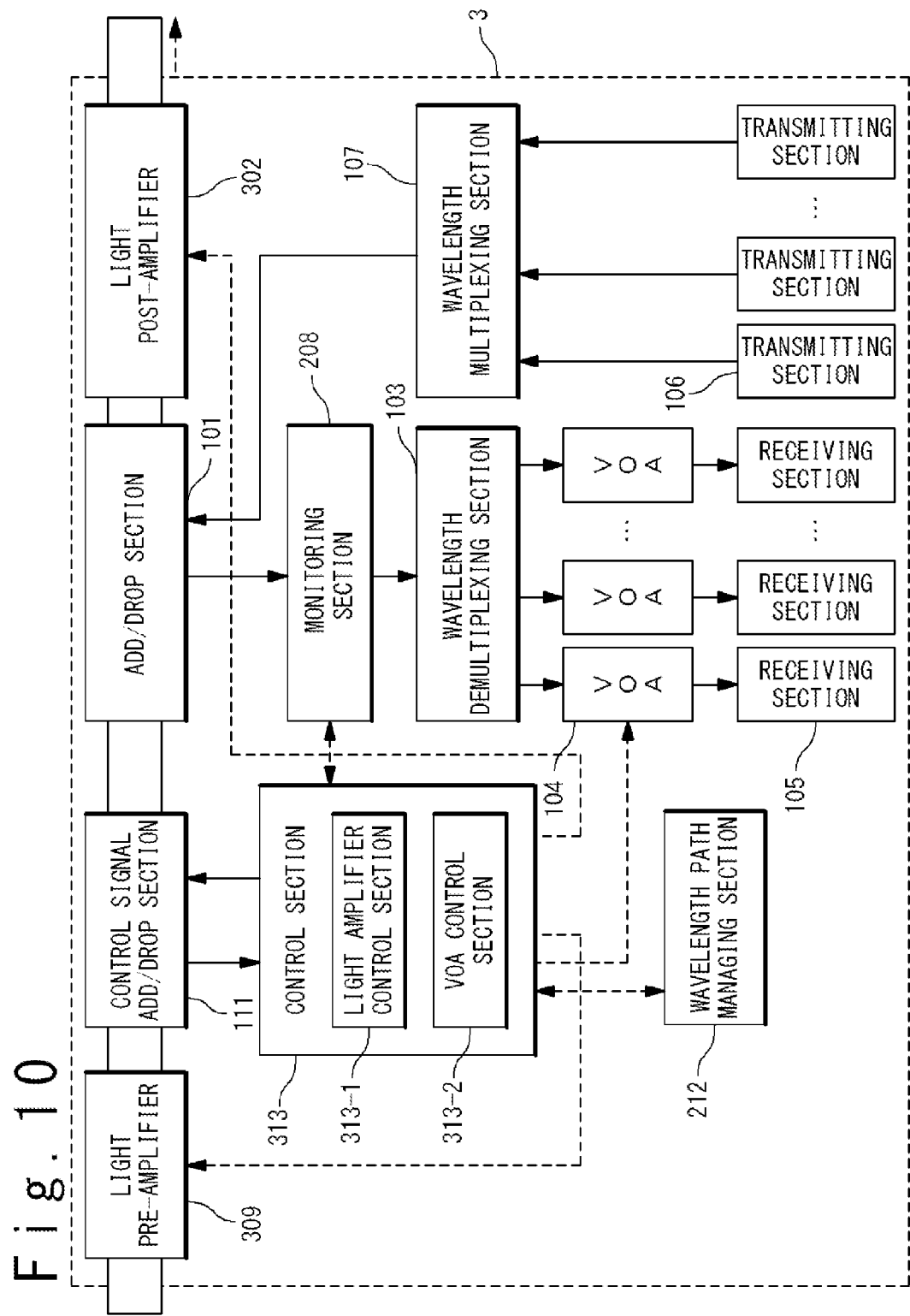

LIGHT POWER CONTROL SYSTEM, LIGHT POWER CONTROL NODE APPARATUS, AND METHOD OF CONTROLLING LIGHT POWER

CROSS REFERENCE TO RELATED APPLICATIONS

This application is a National Stage of International Application No. PCT/JP2010/069511 filed Nov. 2, 2010, claiming priority based on Japanese Patent Application No. 2009-254135 filed Nov. 5, 2009, the contents of all of which are incorporated herein by reference in their entirety.

TECHNICAL FIELD

The present invention is related to a light power control in a node to which a wavelength path is set, in a photonic network.

BACKGROUND ART

In a photonic network, a light amplifier is an important device to elongate a transmission distance of a light signal. In the photonic network, the WDM (Wavelength Division Multiplexing) transmission using a plurality of wavelengths is general for the transmission of a large amount of data in the network. In case of the WDM transmission, the light amplifier amplifies the light signal of the plurality of wavelengths. Here, it is thought of that the light power of the light signal which is supplied to the light amplifier changes due to increase or decrease of the number of wavelength paths on the network. For example, when the number of wavelength paths for the light signal which is supplied to the light amplifier is decreased, the light power of the light signal which is supplied to the light amplifier decreases. In this case, it is necessary to decrease the light power of the light signal which is outputted from the light amplifier, according to the supplied light signal.

CITATION LIST

[Patent Literature 1] JP 2006-166478A

SUMMARY OF THE INVENTION

In the light amplifier described in Patent Literature 1, there are an ALC (Automatic Level Control) mode and an AGC (Automatic Gain Control) mode. In the ALC mode, data of increase or decrease of the number of wavelength paths is received from a control signal on the network, and the output signal of the light amplifier is increased or decreased based on the data. However, a time of about hundreds msec is required to increase or decrease in light power of the output signal of the light amplifier. When the number of wavelength paths for the light signal which is supplied to the light amplifier is decreased, there is not a change in the light power of the light signal which is outputted from the light amplifier for the time of hundreds msec. Therefore, the light power per one wavelength path has increased temporarily and as the result of this, there is a possibility that the data can not be received correctly in a receiving end of the wavelength path.

In the AGC mode, when the light power of the light signal supplied to the light amplifier changes, the light power of an output signal of the light amplifier changes so that a constant gain is kept, by adjusting the power of excitation light according to the change. The output signal of the light amplifier can be changed faster in the AGC mode than in the ALC mode.

However, generally, because the light amplifiers are connected in a multi-stage configuration, there is a possibility that the time which can not receive data right in the receiving end of the wavelength path has becomes long. Also, the cost is high in the AGC mode.

It is demanded that data can be received right in the receiving end by use of a simple technique, even when there is the increase or decrease of the number of wavelength paths.

The light power control system according to an aspect of the present invention is used in a network in which a control signal is transmitted to instruct setting of a wavelength path, and is provided with a light amplifier control section configured to carry out a constant output control to a light amplifier which amplifies a light signal transmitted from a node to another node, when the node in the network receives the control signal; and a variable optical attenuator control section configured to adjust an attenuation quantity of a variable optical attenuator to attenuate a light power of the light signal on any of wavelength paths, when the node receives the control signal and moreover the light signal is transmitted on any of wavelength paths of the node.

The light power control node apparatus according to an aspect of the present invention is used in a node of a network in which a control signal is transmitted to instruct setting of a wavelength path, and is provided with a light amplifier control section configured to carry out a constant output control to a light amplifier which amplifies a light signal transmitted to another node by the node, when the node receives the control signal; and a variable optical attenuator control section configured to adjust an attenuation quantity of a variable optical attenuator to attenuate a light power of the light signal on any of wavelength paths, when the node receives the control signal and moreover the light signal is transmitted on any of wavelength paths of the node.

A method of controlling a light power in an aspect of the present invention includes carrying out a constant output control to a light amplifier which amplifies a light signal transmitted to another node by a node, when the node of the network receives the control signal; and adjusting an attenuation quantity of a variable optical attenuator to attenuate a light power of the light signal on any of wavelength paths, when the node receives the control signal and moreover the light signal is transmitted on the any of wavelength paths of the node.

According to the present invention, by a simple technique, data can be received right in the receiving end when the number of wavelength paths increases or decreases.

BRIEF DESCRIPTION OF THE DRAWINGS

The above object, other purpose, effect and feature of the present invention become clearer from the description of the exemplary embodiments in cooperation with the attached drawings:

FIG. 9 is a flow chart showing an operation to return the value of VOA to an initial value; and FIG. 10 is a block diagram of the node in a third exemplary embodiment.

DESCRIPTION OF EXEMPLARY EMBODIMENTS

[First Exemplary Embodiment]

Figure 1:
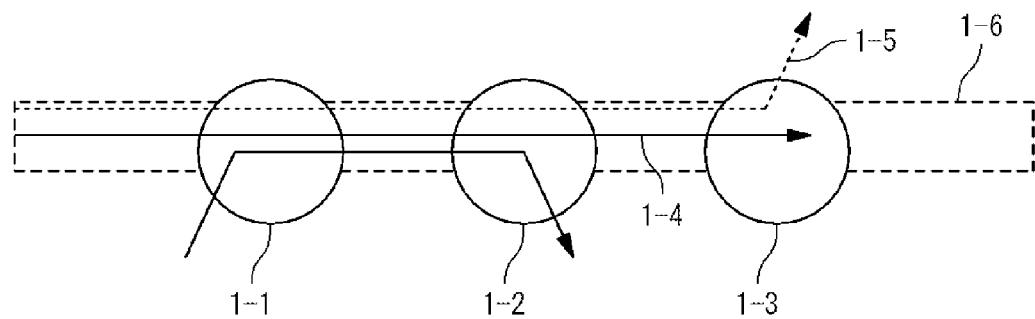
FIG. 1 is a network diagram.

Hereinafter, referring to the attached drawings, the exemplary embodiments of the present invention will be described in detail. First, a configuration example of the first exemplary embodiment will be described. FIG. 1 shows a network to which a light power control system of the present exemplary embodiment is applied. Wavelength paths are optionally set among plurality of nodes 1-1 to 1-3 in the network 1-6. A control signal 1-4 is transmitted to instruct the setting of the wavelength paths on the network 1-6. For example, the control signal is a signal to instruct the setting of a new wavelength path or a signal to instruct the removal of the wavelength path. When a new wavelength path 1-5 is set, a path setting control signal is transmitted on the route where the new wavelength path is set. When the wavelength path is removed, a path removal control signal is transmitted on the route where the wavelength path is removed.

Figure 2:
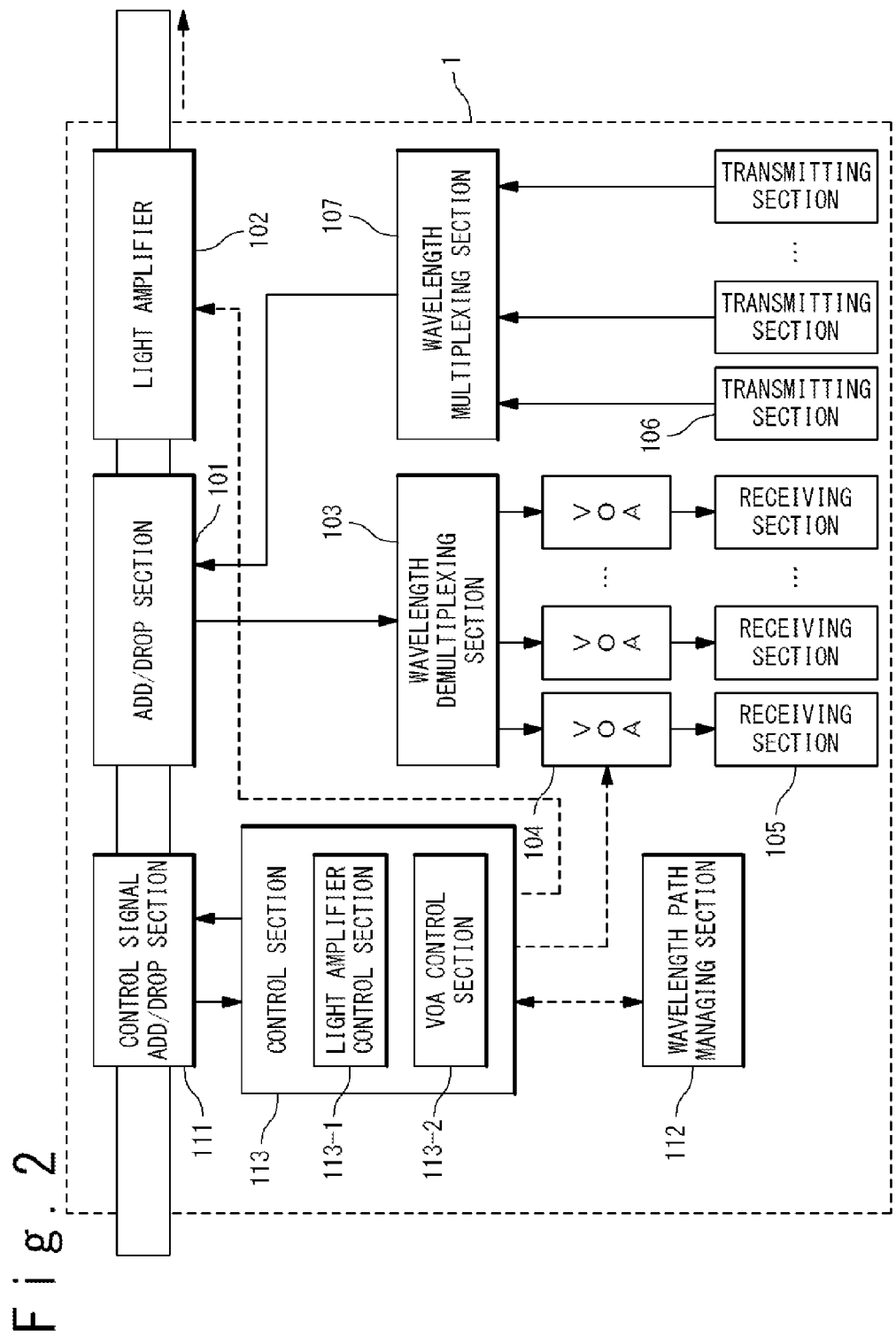
FIG. 2 is a block diagram of a node.

FIG. 2 shows a block diagram of the light power control node apparatus which is provided in the node 1 (i.e. an optional node of the nodes 1-1 to 1-3 in FIG. 1). Such a light power control system and such a light power control node apparatus can be applied to an optional node in the network 1-6. The node 1 is provided with an ADD/DROP section 101 which carries out ADD/DROP of a data signal, a light amplifier 102 which amplifies a light signal, a wavelength demultiplexing section 103 which demultiplexes a multiplexed signal in units of wavelengths, VOAs (Variable Optical Attenuators) 104, each of which can control an attenuation quantity of the light signal for every wavelength, receiving sections 105, each of which receives a light signal of the wavelength, transmitting sections 106, each of which transmits a light signal with a wavelength, a wavelength multiplexing section 107 which multiplexes light signals from the transmitting sections 106, a control signal ADD/DROP section 111 which carries out ADD/DROP of the control signal, a wavelength path managing section 112 which manages data of the wavelength paths, and a control section 113 which processes the control signal. The control section 113 is provided with a light amplifier control section 113-1 and a VOA control section 113-2, and is connected with the VOA 104 and the light amplifier 102 by control lines so as to control them. In FIG. 2, the light amplifier 102 is single, but a configuration may be adopted in which two light amplifiers are provided on the front and back sides of the ADD/DROP section 101.

Figure 3:
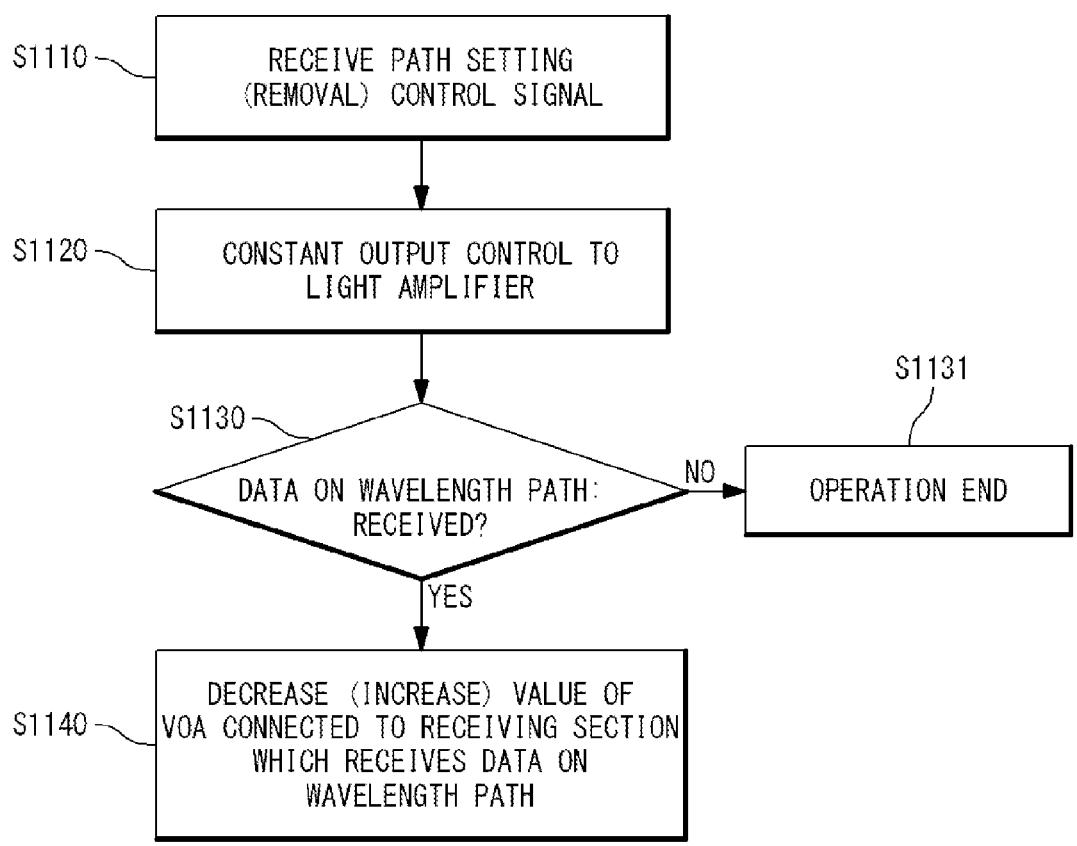
FIG. 3 is a flow chart showing an operation when the node receives a path setting (removal) control signal.

An operation example in the first exemplary embodiment will be described. FIG. 3 is a flow chart showing an operation of the light power control node apparatus when the node 1 receives a path setting (path removal) control signal. The control section 113 receives the path setting (path removal) control signal through the control signal ADD/DROP section 111 (S1110). After the reception of the control signal, the light amplifier control section 113-1 sends out the control signal to the light amplifier 102 to control the output of the light amplifier 102 (S1120) to be constant. There is no change in the output power of the light amplifier 102 even when the power of a light signal supplied to the light amplifier 102 changes because the constant output control is carried out to the light amplifier 102. Next, the control section 113 refers to the wavelength path managing section 112 to confirm whether or not its own node is using a wavelength path, that is, whether or not the wavelength path on which a light signal of a wavelength is transmitted is in a use state (S1130). When the wavelength path is not being used (S1130/No), the operation ends just as it is (S1131). When the light signal on the wavelength path is received (S1130/Yes), the VOA control section 113-2 sends out the control signal to the VOA 104 connected with the receiving section 105 which receives the light signal on the wavelength path, to control the value of the VOA 104, i.e. the attenuation quantity of the VOA 104 (S1140).

Here, when receiving the path setting control signal, the control section 113 decreases the value of the VOA 104. That is, the control section 113 decreases the attenuation quantity of the light signal by the VOA 104. By such an operation, when a light signal is transmitted on any of wavelength paths in a node on the network, the attenuation quantity of the light power of the light signal by the variable optical attenuator (VOA) in any of the wavelength paths can be adjusted. Because the light signal supplied to the light amplifier 102 increases but the output is constant when a wavelength path is set newly, a signal amplification factor per a wavelength is decreased. Therefore, the receiving section can receive a signal in an optimal light power even when the wavelength path is set newly by increasing the attenuation quantity of the VOA 104 in advance.

On the other hand, when receiving the path removal control signal, the control section 113 decreases the attenuation quantity of the VOA 104. Because the light signal supplied to the light amplifier 102 decreases when the wavelength path is removed but the output is to be constant, the signal amplification factor per a wavelength increases. Therefore, the receiving section 105 can receive the light signal in an optimal light power even when the wavelength path is removed by decreasing the attenuation quantity of the VOA 104 in advance. The rate of increase or decrease of the attenuation quantity of the VOA 104 is calculated based on the signal amplification factor per one wavelength. When a plurality of wavelength paths are set or removed at a same time, the rate of increase or decrease of the attenuation quantities of the VOAs 104 is calculated based on the number of remaining wavelength paths. Also, the initial values of the attenuation quantity of the VOA 104 are set in consideration of the minimum light reception power and the maximum light reception power of the receiving section.

As described above, in the first exemplary embodiment, by carrying out a constant output control to the light amplifier 102 when receiving the path setting (removal) control signal and controlling the attenuation quantity of the VOA 104, the light signal can be received in an optimal light power by the receiving end of the originally set wavelength path. Therefore, the data can be received right by the receiving end. Especially, when many wavelength paths are set (removed) at a same time, because it would be difficult that the light amplifier 102 itself deals a large change of the supplied light signal, it is effective to adjust the attenuation quantity of the VOA 104 while carrying out the constant output control to the light amplifier 102 based on the path setting (removal) control signal.

[Second Exemplary Embodiment]

In a second exemplary embodiment, the light power control when a fault such as a fiber break and a node failure occurs on the network will be described. A configuration example of the second exemplary embodiment will be described. In the network of the present exemplary embodiment, when the fault occurs on an operation wavelength path, a spare wavelength path is set to the operation wavelength path. Another light signal of the wavelength path is transmitted on the spare wavelength path before the fault occurs. When the fault occurs, the control signal is transmitted onto the spare wavelength path to notify the fault.

Figure 4:
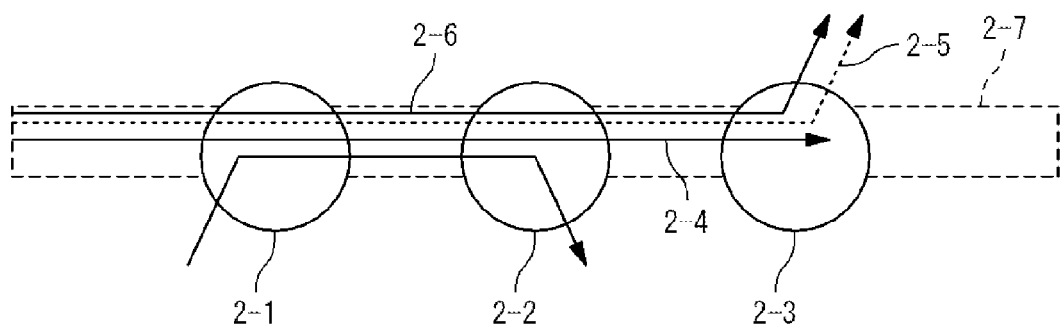
FIG. 4 is a network diagram of a second exemplary embodiment.

FIG. 4 shows a network diagram of the second exemplary embodiment. The network 2-7 is provided with a plurality of nodes 2-1 to 2-3. The spare wavelength path 2-5 is used when a fault occurs in the operation wavelength path. A low priority wavelength path 2-6 is used to flow data when the fault does not occur on the operation wavelength path. However, when the fault occurs, the low priority wavelength path 2-6 is stopped because the spare wavelength path 2-5 is used for data transmission. A fault notice signal 2-4 is transmitted on the spare wavelength path 2-5 when the fault occurs on the operation wavelength path.

Figure 5:
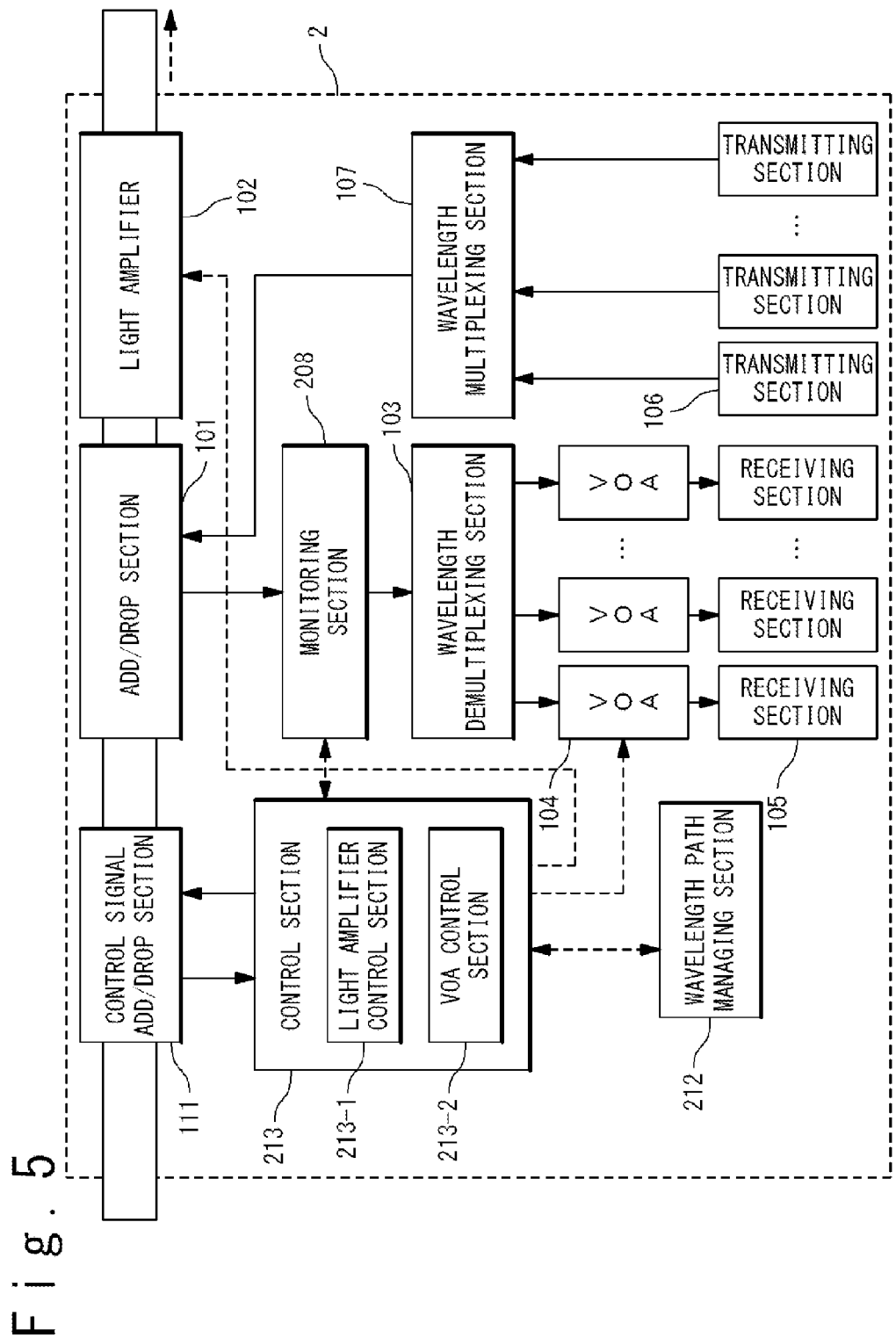
FIG. 5 is block diagram of the node in the second exemplary embodiment.

FIG. 5 is block diagram showing a node 2 (an optional node in the nodes 2-1 to 2-3 in FIG. 4) in the second exemplary embodiment. The difference from the configuration shown in FIG. 2 is in that a monitoring section 208 is provided between the ADD/DROP section 101 and the wavelength multiplexing section 103. A control section 213 and the monitoring section 208 are connected by a control line. The monitoring section 208 monitors the number of wavelength paths used in the node. Because a DROP section of the ADD/DROP section 101 shown in FIG. 5 has a configuration like an optical coupler, the number of wavelengths which are used in the transmission line can be confirmed by the monitoring section 208.

An operation example of the second exemplary embodiment will be described. In the present exemplary embodiment, the variable optical attenuator (VOA) control section 213-2 increases the attenuation quantity of the variable optical attenuator (VOA) 104 to attenuate the light power of a light signal on a different wavelength path, when a node receives a control signal and moreover its own node receives a light signal on another wavelength path or a light signal of another wavelength path passes on its own node. As described below, in the present exemplary embodiment, when the number of wavelengths monitored currently by the monitoring section 208 increases compared with the number of wavelengths monitored previously, the VOA control section 213-2 decreases the attenuation quantity of the VOA 104 according to the increase.

Figure 6:
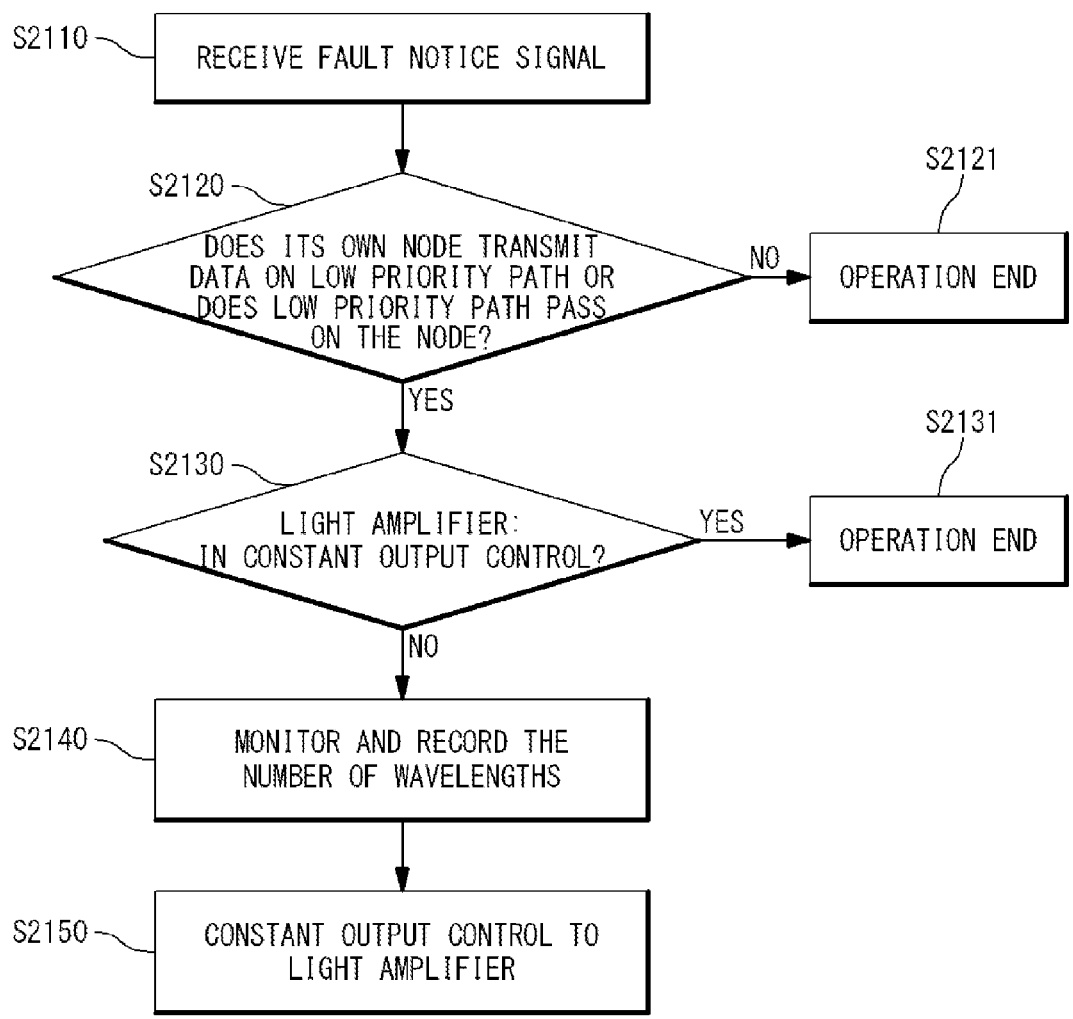
FIG. 6 is a flow chart showing an operation of a light amplifier when the node receives a fault notice signal.

FIG. 6 is a flow chart showing an operation of the light amplifier 102 when each of the nodes 2-1 to 2-3 receives a fault notice signal. The control section 213 receives the fault notice signal through the control signal ADD/DROP section 111 (S2110). The fault notice signal is generated every operation wavelength path which receives then influence of the fault. For example, when 10 operation wavelength paths fail at the same time, 10 fault notice signals are generated.

After the reception of the fault notice signal, whether its own node transmits a light signal on a low priority wavelength path of the same wavelength as a spare wavelength path or a low priority wavelength path with the same wavelength as the spare wavelength path passes on its own node is confirmed (S2120). Specifically, it confirms that the control section 213 refers to the wavelength path managing section 212, to confirm whether the light signal is transmitted on the low priority wavelength path with the same wavelength as the spare wavelength path or the low priority wavelength path with the same wavelength as the spare wavelength path passes on its own node. The wavelength of the spare wavelength path is written in the fault notice signal.

When its own node does not transmit a light signal on the low priority wavelength path with the same wavelength as the spare wavelength path, or the low priority wavelength path with the same wavelength as the spare wavelength path does not pass on it own node (S2120/No), the operation ends (S2121). When its node transmits a light signal on the low priority wavelength path or the low priority wavelength path passes on its own node (S2120/Yes), the control section 213 confirms whether or not the light amplifier 102 is under the constant output control (S2130).

When the light amplifier 102 is under the constant output control (S2130/Yes), the operation ends (S2131). When the light amplifier 102 is not under the constant output control (S2130/No), the light amplifier control section 213-1 instructs the monitoring section 208 to monitor the number of wavelengths and record the number of monitored wavelengths as a record wavelength number (S2140). The control section 213-1 transmits a control signal to the light amplifier 102 so as to carry out the constant output control, after recording the record wavelength number (S2150).

When a fault has occurred, the transmission on the low priority wavelength path is stopped and data newly flows through a spare wavelength path. Therefore, a light signal supplied to the light amplifier 102 decreases and then increases immediately. Therefore, the light amplifier 102 is subjected to the constant output control if its own node transmits a light signal on the low priority wavelength path and the low priority wavelength path passes on its own node, when receiving the fault notice signal.

Figure 7:
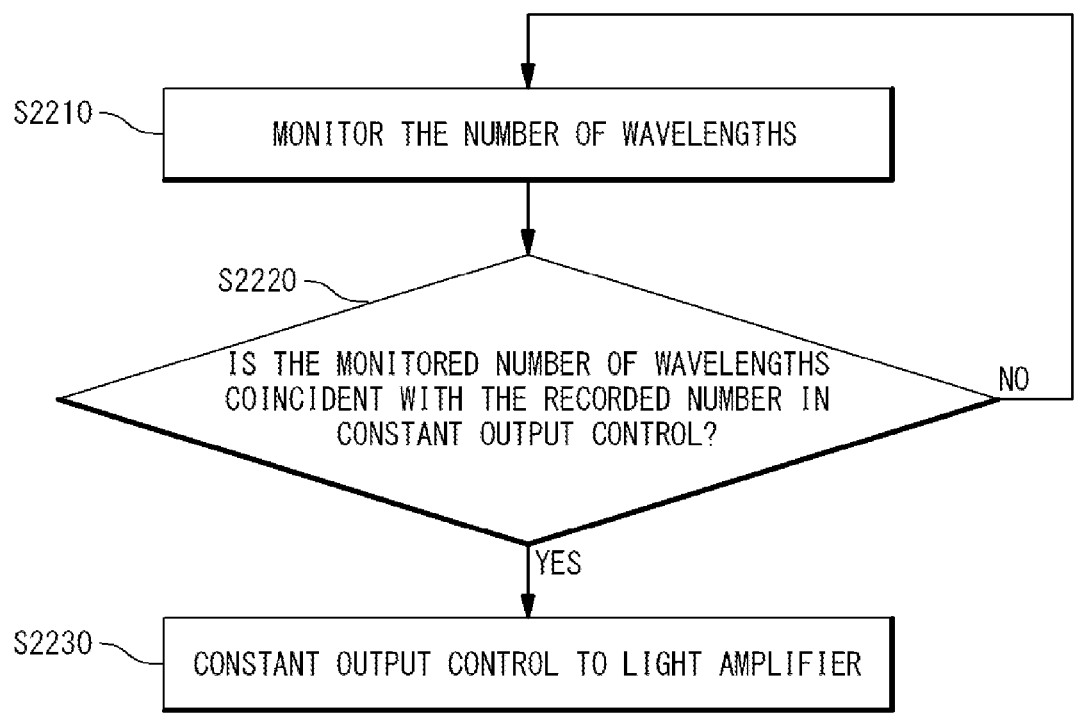
FIG. 7 is a flow chart showing an operation which a constant output control the light amplifier is stopped.

FIG. 7 is a flow chart showing an operation of the light power control node apparatus when the constant output control to the light amplifier 102 is cancelled. After the control section 213 receives all the fault notice signals, the control section 213 receives data of the number of monitored wavelengths from the monitoring section 208 periodically (S2210). After that, the control section 213 confirms whether or not the number of wavelengths recorded when the light amplifier 102 is subjected to the constant output control is coincident with the number of monitored wavelengths (S2220). When being coincident (S2220/Yes), the control section 213-1 transmits the control signal to the light amplifier 102 to cancel the constant output control to the light amplifier 102 (S2230). When being not coincident (S2220/No), the control section 213 repeats monitoring the wavelength number (S2210).

The fact that the number of wavelengths recorded when the constant output control to the light amplifier 102 is carried out is coincident with the number of monitored wavelengths, indicates that data on the spare wavelength path flows through the route in which the flow of the low priority wavelength path is stopped. Therefore, the constant output control to the light amplifier 102 is cancelled.

Figure 8:
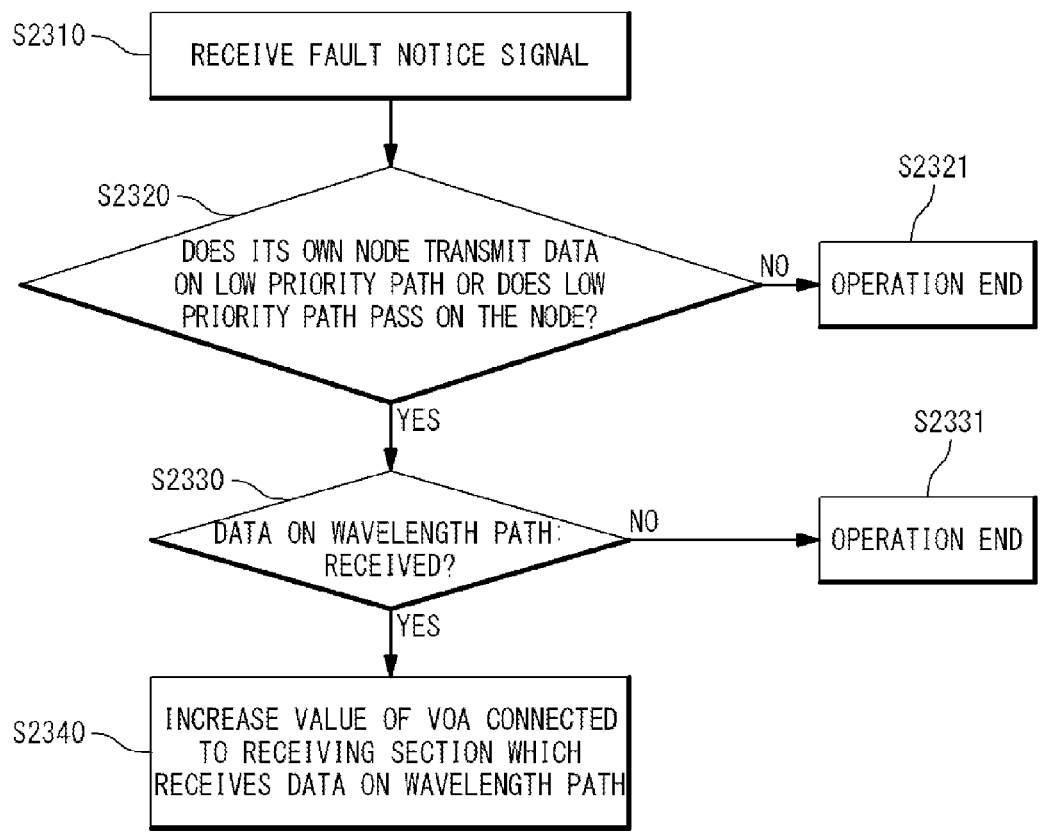
FIG. 8 is a flow chart showing an operation of a VOA when the node receives the fault notice signal.

FIG. 8 is a flow chart showing an operation of the VOA 104 when each of the nodes 2-1 to 2-3 receives the fault notice signal. This operation is carried out in parallel with the operation of FIG. 6. The control section 213 receives the fault notice signals through the control signal ADD/DROP section 111 (S2310). After the reception of the fault notice signals, the control section 213 confirms whether or not its own node receives a light signal on the low priority wavelength path with the same wavelength as the spare wavelength path or the low priority wavelength path with the same wavelength as the spare wavelength path passes on its own node (S2320). Specifically, the control section 213 confirms by referring to the wavelength path managing section 212, in the same way as a case of FIG. 6.

When its own node does not receive the light signal the low priority wavelength path with the same wavelength as the spare wavelength path or the low priority wavelength path with the same wavelength as the spare wavelength path does not pass on its own node (S2320/No), the operation ends (S2321). When its own node receives the low priority wavelength path with the same wavelength as the spare wavelength path or the low priority wavelength path with the same wavelength as the spare wavelength path passes on its own node (S2320/Yes), the control section 213 confirms whether or not its own node receives the light signal on the wavelength path (S2330). Here, the control section 213 confirms by referring to the wavelength path managing section 212.

When its own node does not receive a signal on the wavelength path (S2330/No), the operation ends (S2331). When its own node receives the light signal on the wavelength path (S2330/Yes), the VOA control section 213-2 transmits the control signal to the VOA 104 connected with the receiving section 105 which receives the light signal on the wavelength path, so as to decrease the attenuation quantify of the VOA 104 (S2340). This decrease of the VOA 104 is for the purpose to deal with to the increase of the signal amplifier factor per a wavelength path through the stop of the low priority wavelength path.

FIG. 9 is a flow chart showing the operation of returning the value of the VOA 104 to the initial value. This operation is carried out in parallel with the operation of FIG. 7. After the control section 213 receives all the fault notice signals, the control section 213 periodically receives data of the number of wavelengths which are monitored by the monitoring section 208 (S2410). After the reception, the control section 213 compares the received number of wavelengths with the number of wavelengths monitored previously, to confirm whether or not the number of wavelengths monitored currently increases (S2420).

When the number of wavelengths has increased (S2420/Yes), the control section 213 increases the attenuation quantity of the VOA 104 connected with the receiving section 105 which receives the light signal on the wavelength path based on the increased number of wavelengths (S2430). Supposing that the attenuation quantity of the VOA 104 should be increased by 3 dB to the increase of one wave, it is increased by 6 (=3×2) dB in case of the increase of 2 wavelengths, and by 9 (=3×3) dB in case of the increase of 3 wavelengths. This increase of the attenuation quantity of the VOA 104 is the purpose to deal with the decrease of the signal amplifier factor per one wavelength path when the low priority wavelength path is stopped and data flows through the spare wavelength path newly.

When the number of wavelengths monitored currently is not increased as the result of comparison of the number of wavelengths monitored currently and the number of wavelengths monitored previously (S2420/No), and after the increase of the attenuation quantity of the VOA 104 (S2430), the control section 213 confirms whether or not the attenuation quantity of the VOA 104 is coincident with an initial value (S2440). If being coincident (S2440/Yes), the operation ends (S2450). If being not coincident (S2440/No), the control section 213 repeats the monitoring of the number of wavelengths (S2410).

As described above, in the second exemplary embodiment, the change of the signal supplied to the light amplifier 102 becomes sharp when the transmission on the low priority wavelength path is stopped due to a fault occurrence and the data is transmitted on the spare wavelength path. The light amplifier 102 is subjected to the constant output control while the change of the signal is sharp, so that the data can be received right by a receiving end of the wavelength path, by adjusting the attenuation quantity of the VOA. Especially, when the transmission on a large amount of low priority wavelength paths is stopped and the transmission on a large amount of spare wavelength paths is carried out, it is thought of that it would be more difficult to deal with the great change of the light signal by the operation of the light amplifier 102 itself. Therefore, it would be effective that the light amplifier 102 is subjected to the constant output control based on the fault notice signals so as to control the attenuation quantities of the VOAs.

[Third Exemplary Embodiment]

In a third exemplary embodiment, the light power control when faults such as a fiber break and a node fault occur on the network, like the second exemplary embodiment will be described. Here, while one light amplifier is provided in the node in the second exemplary embodiment, two light amplifiers are provided in the node in the third exemplary embodiment. In the present exemplary embodiment, as described below, the node in the network has a 2-stage configuration of an upstream light amplifier (light pre-amplifier) 309 which amplifies and outputs a light signal from an upstream node, and a downstream light amplifier (light post-amplifier) 302 which amplifies the light signal from the upstream light amplifier 309 and outputs the amplified light signal to a downstream node. The light amplifier control section 313-1 of the control section 313 controls the light amplifiers at a same time such that these light amplifiers are in the same control mode. The other operation of the control section 313 such as the operation of the VOA control section 313-2 is same as in the second exemplary embodiment.

The configuration example of the third exemplary embodiment will be described. The configuration of the network is same as shown in FIG. 4 in the second exemplary embodiment. FIG. 10 shows a block diagram of the node 3 in the third exemplary embodiment. The difference from the configuration of FIG. 5 is in that the two light amplifiers exist such as the light pre-amplifier 309 and the light post-amplifier 302. The light pre-amplifier 309 is arranged in front of the ADD/DROP section 101 and the light post-amplifier 302 is arranged behind the ADD/DROP section 101.

Because the two light amplifiers operate at a same time as one amplifier, the third exemplary embodiment operates in the same way as the operation example in the second exemplary embodiment. It is possible to control the light powers even in case of the two light amplifiers.

The present invention has been described with reference to the above exemplary embodiments but the present invention is not limited to the exemplary embodiments. Various modifications can be carried out to the exemplary embodiments. For example, the above exemplary embodiments can be combined with each other.

This application claims a priority based on Japanese Patent Application No. JP 2009-254135 filed on Nov. 5, 2009. The disclosure thereof is incorporated herein by reference.

The invention claimed is:

1. A light power control system used in a network in which a control signal is transmitted to instruct setting of a wavelength path, comprising:
   a light amplifier control section configured to carry out a constant output control to a light amplifier which amplifies a light signal transmitted from a node to another node, when said node in said network receives the control signal; and
   a variable optical attenuator control section configured to adjust an attenuation quantity of a variable optical attenuator to attenuate a light power of the light signal on any of wavelength paths, when said node receives the control signal and moreover the light signal is transmitted on said any of wavelength paths of said node.

2. The light power control system according to claim 1, wherein in said network, a current operation wavelength path is switched to a spare wavelength path when a fault has occurred in said current operation wavelength path, a light signal for another wavelength path is transmitted on said spare wavelength path before the fault has occurred, and the control signal is transmitted onto said spare wavelength path upon the fault occurrence, to notify the fault, wherein said light amplifier control section carries out the constant output control to said light amplifier which amplifies the light signal transmitted from said node to said another node, when said node receives the control signal and moreover said node transmits a light signal for another wavelength path or the light signal for said another wavelength path passes said node, and wherein said variable optical attenuator control section adjusts the attenuation quantity of said variable attenuator to attenuate a light power of the light signal for said another wavelength path, when said node receives the control signal and moreover said node receives the light signal for said another wavelength path or the light signal for said another wavelength path passes on said node.

3. The light power control system according to claim 2, further comprising:

a monitoring section configured to monitor the number of wavelengths of wavelength paths which pass said node, wherein when the number of wavelengths monitored currently by said monitoring section increases more than the number of wavelengths monitored previously, said variable optical attenuator control section adjusts the attenuation quantity of said variable optical attenuator to increase the light power by wavelength based on the increase.

4. The light power control system according to claim 3, wherein when said node of said network receives the control signal and moreover said node transmits the light signal for said another wavelength path or the light signal for said another wavelength path passes on said node, said light amplifier control section records the number of wavelengths of the wavelength paths which pass on said node, as a record wavelength number, and wherein said light amplifier control section stops the constant output control to said light amplifier, when the record wavelength number is coincident with the number of wavelengths monitored currently by said monitoring section.

5. The light power control system according to claim 2, wherein said light amplifier of said node comprises:

an upstream light amplifier configured to amplify the light signal from an upstream node and output the amplified light signal; and a downstream light amplifier configured to amplify the light signal from said upstream light amplifier and output the amplified light signal to a downstream node.

6. The light power control system according to claim 1, wherein the control signal is a signal to instruct the setting of a new wavelength path or removal of an existing wavelength path, and wherein said variable optical attenuator control section adjusts the attenuation quantity of said variable optical attenuator to attenuate the light power of the light signal on any of wavelength paths, when said node receives the control signal and moreover receives the light signal on said any of wavelength paths.

7. A light power control node apparatus used in a node of a network in which a control signal is transmitted to instruct setting of a wavelength path, comprising:

a light amplifier control section configured to carry out a constant output control to a light amplifier which amplifies a light signal transmitted to another node by said node, when said node receives the control signal; and a variable optical attenuator control section configured to adjust an attenuation quantity of a variable optical attenuator to attenuate a light power of the light signal on any of wavelength paths, when said node receives the control signal and moreover the light signal is transmitted on said any of wavelength paths of said node.

8. The light power control node apparatus according to claim 7, wherein in said network, a current operation wavelength path is switched to a spare wavelength path when a fault has occurred in said current operation wavelength path, a light signal for another wavelength path is transmitted on said spare wavelength path before the fault has occurred, and the control signal is transmitted onto said spare wavelength path upon the fault occurrence, to notify the fault, wherein said light amplifier control section carries out the constant output control to said light amplifier which amplifies the light signal transmitted to said another node by said node, when said node receives the control signal and moreover said node transmits a light signal for another wavelength path or the light signal for said another wavelength path passes said node, and wherein said variable optical attenuator control section adjusts the attenuation quantity of said variable attenuator to attenuate a light power of the light signal for said another wavelength path, when said node receives the control signal and moreover said node receives the light signal for said another wavelength path or the light signal for said another wavelength path passes on said node.

9. The light power control node apparatus according to claim 8, further comprising:

a monitoring section configured to monitor the number of wavelengths of wavelength paths which pass said node, wherein when the number of wavelengths monitored currently by said monitoring section increases more than the number of wavelengths monitored previously, said variable optical attenuator control section adjusts the attenuation quantity of said variable optical attenuator to increase the light power by wavelength based on the increase.

10. The light power control node apparatus according to claim 9, wherein when said node of said network receives the control signal and moreover said node transmits the light signal for said another wavelength path or the light signal for said another wavelength path passes on said node, said light amplifier control section records the number of wavelengths of the wavelength paths which pass on said node, as a record wavelength number, and wherein said light amplifier control section stops the constant output control to said light amplifier, when the record wavelength number is coincident with the number of wavelengths monitored currently by said monitoring section.

11. The light power control node apparatus according to claim 8, wherein said light amplifier of said node comprises:

an upstream light amplifier configured to amplify the light signal from an upstream node and output the amplified light signal; and a downstream light amplifier configured to amplify the light signal from said upstream light amplifier and output the amplified light signal to a downstream node.

12. The light power control node apparatus according to claim 7, wherein the control signal is a signal to instruct the setting of a new wavelength path or removal of an existing wavelength path, and wherein said variable optical attenuator control section adjusts the attenuation quantity of said variable optical attenuator to attenuate the light power of the light signal on any of wavelength paths, when said node receives the control signal and moreover receives the light signal on said any of wavelength paths.

13. A method of controlling a light power on a network that a control signal is transmitted to instruct setting of a wavelength path, comprising:

carrying out a constant output control to a light amplifier which amplifies a light signal transmitted to another node by a node, when said node of said network receives the control signal; and adjusting an attenuation quantity of a variable optical attenuator to attenuate a light power of the light signal on any of wavelength paths, when said node receives the control signal and moreover the light signal is transmitted on said any of wavelength paths of said node.

14. The method according to claim 13, wherein in said network, a current operation wavelength path is switched to a spare wavelength path when a fault has occurred in said current operation wavelength path, a light signal for another wavelength path is transmitted on said spare wavelength path before the fault has occurred, and the control signal is transmitted onto said spare wavelength path upon the fault occurrence, to notify the fault, wherein said carrying out a constant output control comprises:

carrying out the constant output control to said light amplifier which amplifies the light signal transmitted to said another node by said node, when said node receives the control signal and moreover said node transmits a light signal for another wavelength path or the light signal for said another wavelength path passes said node, and wherein said adjusting an attenuation quantity of a variable optical attenuator comprises:

adjusting the attenuation quantity of said variable attenuator to attenuate a light power of the light signal for said another wavelength path, when said node receives the control signal and moreover said node receives the light signal for said another wavelength path or the light signal for said another wavelength path passes on said node.

15. The method according to claim 14, further comprising:

monitoring the number of wavelengths of wavelength paths which pass said node; and adjusting, when the number of wavelengths monitored currently by said monitoring section increases more than the number of wavelengths monitored previously, the attenuation quantity of said variable optical attenuator to increase the light power by wavelength based on the increase.

16. The method according to claim 15, further comprising:

recording, when said node of said network receives the control signal and moreover said node transmits the light signal for said another wavelength path or the light signal for said another wavelength path passes on said node, the number of wavelengths of the wavelength paths which pass on said node, as a record wavelength number; and stopping the constant output control to said light amplifier, when the record wavelength number is coincident with the number of wavelengths monitored currently by said monitoring section.

17. The method according to claim 14, wherein said light amplifier of said node comprises:

an upstream light amplifier configured to amplify the light signal from an upstream node and output the amplified light signal; and a downstream light amplifier configured to amplify the light signal from said upstream light amplifier and output the amplified light signal to a downstream node.

18. The method according to claim 13, wherein the control signal is a signal to instruct the setting of a new wavelength path or removal of an existing wavelength path, and wherein said adjusting an attenuation quantity of a variable optical attenuator comprises:

adjusting the attenuation quantity of said variable optical attenuator to attenuate the light power of the light signal on any of wavelength paths, when said node receives the control signal and moreover receives the light signal on said any of wavelength paths.

* * * * *